April 28, 1959     A. SCHOENMAKER     2,883,753
PRECISION MARKING AND DRAWING INSTRUMENT
Filed March 24, 1958     3 Sheets-Sheet 1

FIG. I.

INVENTOR.
ADRIANUS SCHOENMAKER
BY
B. L. Zanguri
ATTORNEYS.

April 28, 1959 A. SCHOENMAKER 2,883,753
PRECISION MARKING AND DRAWING INSTRUMENT
Filed March 24, 1958 3 Sheets-Sheet 2

INVENTOR.
ADRIANUS SCHOENMAKER
BY
B. L. Zangwill
ATTORNEYS.

April 28, 1959   A. SCHOENMAKER   2,883,753
PRECISION MARKING AND DRAWING INSTRUMENT
Filed March 24, 1958   3 Sheets-Sheet 3
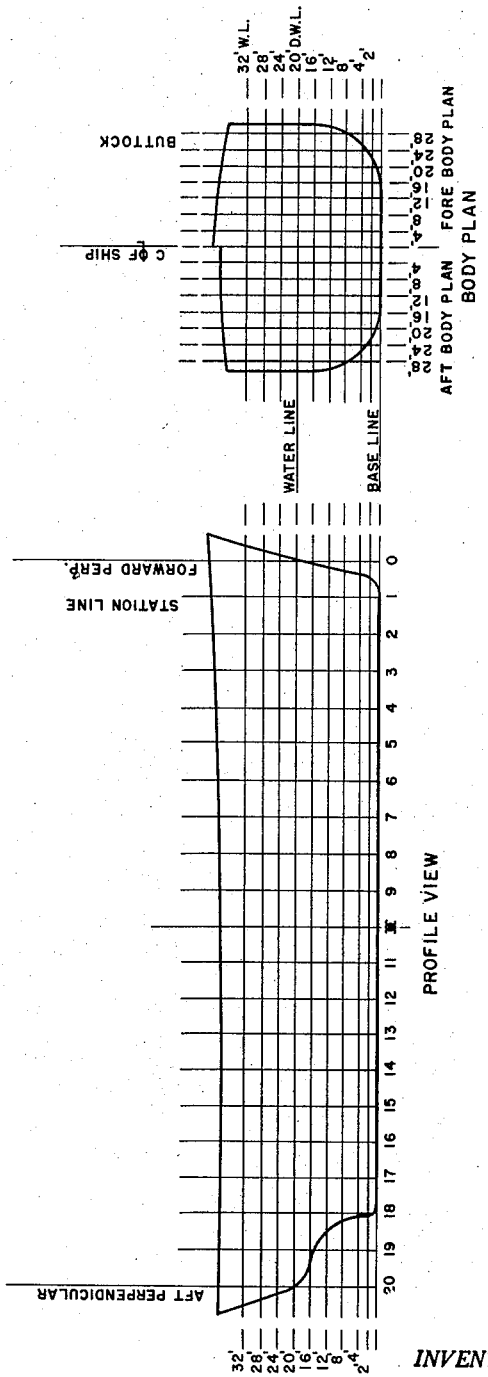
FIG. 4.
FIG. 5.
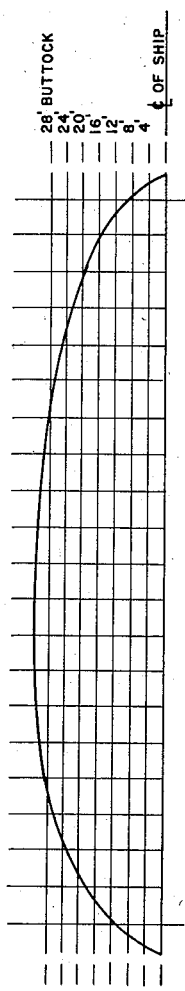
FIG. 6.
INVENTOR.
ADRIANUS SCHOENMAKER
BY
B. L. Zanguill
ATTORNEYS.

United States Patent Office
2,883,753
Patented Apr. 28, 1959

2,883,753
PRECISION MARKING AND DRAWING INSTRUMENT

Adrianus Schoenmaker, Arlington, Va.

Application March 24, 1958, Serial No. 723,611

6 Claims. (Cl. 33—104)

(Granted under Title 35, U.S. Code (1952), sec. 266)

The invention described herein may be manufactured and used by or for the Government of the United States of America for govermental purposes without the payment of any royalties thereon or therefor.

This invention relates to drawing instruments and more particularly to a combination marking device and drawing instrument for use in laying out basic grid lines, that is, a series of accurately drawn, intersecting horizontal and vertical lines.

While not so limited, the instrument of this invention is particularly adapted for use in the design of hull forms for all types of ships.

The instrument, in accordance with the instant invention, enables the designer to produce on a ship's drawing quickly and accurately the required number of horizontal and vertical lines, such as waterlines, buttocks, ship's centerlines, and baselines. Fore and aft perpendiculars and station lines can also be accurately produced with the instrument. It can also be used for other drawings which require accurate and quickly drawn horizontal and vertical lines.

Previously, all of these lines have been marked off by means of an architect's scale. The designer reads the required distances on the scale and marks with a pencil each individual distance so that parallel and vertical lines can be produced from the markings. This manual marking of distances is a tedious, painstaking job. It requires great accuracy and good eyesight, because on the lines drawn over these markings depend the true shape of the new hull, the accuracy of displacement and other curves of form, the fairing of the hull lines is not as difficult and the calculations for hull coefficients, made from the drawn-in hull lines by means of an electronic digital analog computer, are more reliable as to accuracy.

The new precision instrument, hereinafter called a grid plate, comprises essentially a rectangular frame having substantially perfect 90° corners and with the outside upper, lower and side edges substantially perfectly parallel and perpendicular, respectively. On the inside edges of the frame, which frame is made of a stainless steel similar to that used for the blade of a steel T-square, are a series of very accurately spaced dual marking surfaces in slots which are horizontally parallel to a baseline, and a series of dual vertical marking surfaces to the left and right of a centrally located ship's centerline, which vertical marking surfaces are perpendicular to the baseline.

The instrument is so designed, with the marking surfaces or edges on the same side of the slots, that there cannot be a difference of even the thickness of a pencil line between the base or reference lines and the lines drawn parallel thereto.

The marking surfaces have been so placed that for all practical purposes, for ⅛", ¼", ½", and 1" scale drawings, they will serve the designer to mark off the necessary waterlines above a baseline, and buttock lines parallel to a ship's centerline for a body plan.

By sliding the instrument over the top of a straight edge, the vertical lines can be drawn over the dually marked-off spaces by means of the outside vertical edge of the instrument.

By sliding the instrument to the left or right over the straight edge, other markings for profile view waterlines can be marked off. The waterlines are then drawn over these markings with the straight edge for the body plan and profile views.

By turning the instrument 90° on the straight edge, or by placing it on one of the drawn-in-waterlines, the buttocks and ship's longitudinal centerline can be marked off for the third view, the half breadth plan of a ship's lines drawing.

The grid plate is a very accurate, labor and time-saving instrument. A test conducted with the instrument has indicated that the time required to produce a set of grid lines can be reduced to one-fourth of the time required previously.

The grid plate is especially useful for the basic grid lines necessary for the design of the three views of a lines plan, for drawing the sections at station lines, used for displacement calculations, and development of drawings showing Bon Jean curves. Greater accuracy is possible when ship curves are evaluated for ship characteristics by means of the electronic analog-digital computer.

The vertical buttock marking surface distances have a tolerance of ±.002" on each side of the ship's centerline, and the waterline distances also have a tolerance of ±.002" above the ship's baseline. The tolerances for the dimensions from the centerline for buttock lines and from the baseline to the marking surfaces for waterlines are non-accumulative.

Perpendicular lines on a baseline are sometimes erected and checked for accuracy by means of the architect's scale and intersecting circular lines made with a drawing instrument. When the new device is used, this work is unnecessary because the outside vertical edges of the device are practically a perfect 90° with the lower edge, for the erection of perpendicular lines; the maximum tolerance for the 90° corner angles being 0°±0'1".

Marking of the spacings on a prearranged system of straight parallel and perpendicular surfaces is a great advantage over the old scale-measuring method. If additional lines are necessary they can always be very easily added to the drawing.

The marking dimensions shown on the illustrated instrument are for drawings made to a ⅛"=1'0" scale, which is typical for plans of large naval ships in the Bureau of Ships' preliminary design work. For plans drawn to ¹⁄₁₆" scale, the dimensions shown opposite the marking surfaces are multiplied by 2, for plans drawn to ¼" scale the marking surfaces are divided by 2, and so on for larger scales.

The shape and size of the instrument, the number, length, and location of its marking surfaces, and the tolerances for accuracy can be changed to suit the needs of other precision marking problems. A similar type of precision marking and drawing device might be used in shops for sheet metal making and model making, and for parts that have to be marked for machining, and the like. For example, if the device were made of a flexible material, it could be used, together with a stylus or other pointed tool, to mark off graduated spaces on a curved surface.

Other objects and many of the attendant advantages of this invention will be readily appreciated as the same becomes better understood by reference to the following detailed description when considered in connection with the accompanying drawings in which like reference numerals designate like parts throughout the several views thereof and wherein:

Figs. 4, 5 and 6 are a body plan, a profile and a half breadth plan, respectively, showing a typical hull design drawing with sets of grid lines produced by the use of the instrument shown in Fig. 1.

Figure 1:
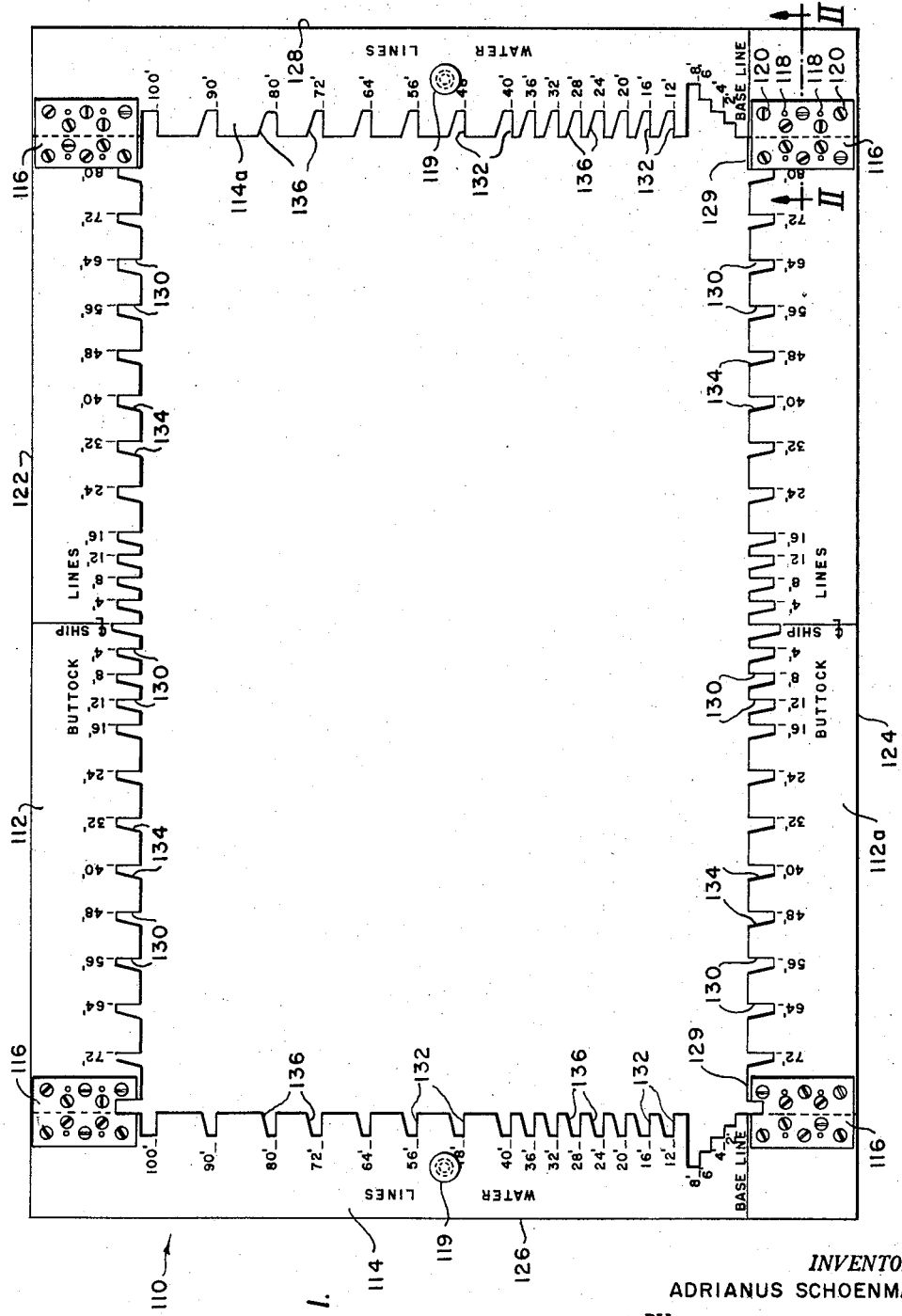
Fig. 1 is a top plan view of an instrument incorporating a preferred embodiment of the present invention.

Referring now to the drawings, first to Fig. 1, wherein there is shown an instrument, in accordance with this invention, in the form of a rectangular frame 110, comprising horizontal upper and lower strips 112 and 112a and left and right hand vertical strips 114 and 114a. The frame members are made of stainless steel similar to that used for a good grade straight edge. The frame may be made as a one-piece construction. However, in practice, it has been found that four frame members or strips facilitate machining and multiple production of the instrument. As shown in Fig. 1, the frame members are connected at the four corners by connection plates 116. The connection plates are formed of stainless steel with beveled upper edges. The four joints between the horizontal and vertical strips are butt joints.

Figure 2:
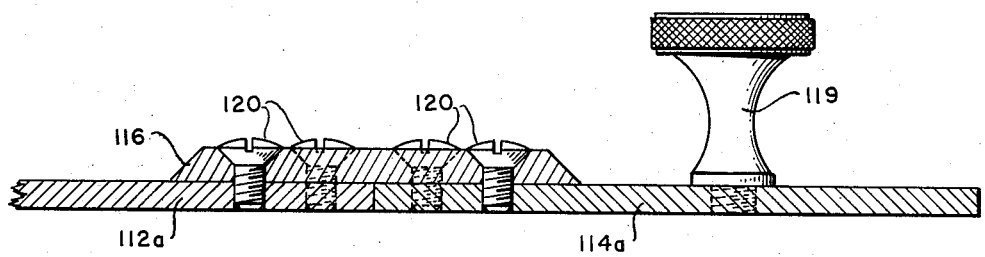
Fig. 2 is a detailed sectional view taken on line 2—2 of Fig. 1.
Figure 3:
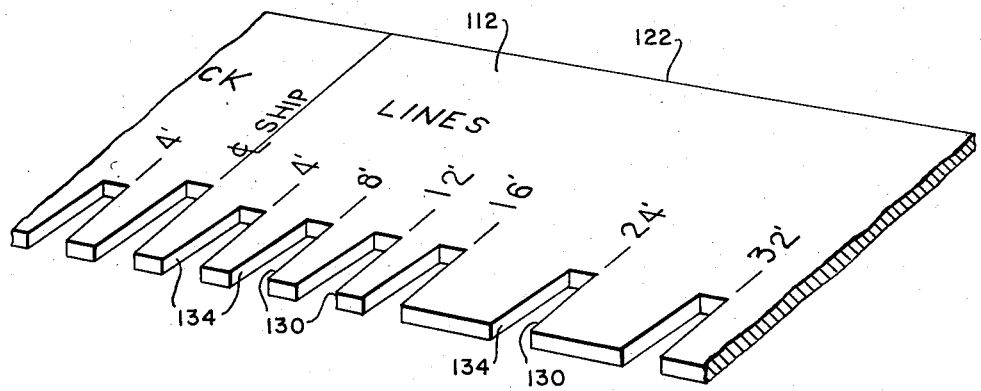
Fig. 3 is an enlarged perspective of a portion A, Fig. 1, showing marking edges of the instrument.

With reference to the lower right corner of the frame (Fig. 1), for example, a true and rigid joint is made by four steel taper pins 118 and ten flat head machine screws 120, spaced in the manner shown; the taper pins being used for rigidity and for lining up the edges of the members in true perpendicular and parallel relation, respectively, and the machine screws being used for permanency and for reinforcing the joint. As shown, the four corners are substantially perfect rectangles; the maximum tolerance for the 90° corner angles being 0°± 0'1". Thus, the outer top edge 122, bottom edge 124, left-side edge 126 and right-side edge 128 of the instrument are truly parallel and perpendicular, respectively, and are used as drawing edges. Two brass knobs 119 are provided for lifting and handling the instrument. As shown in Fig. 2, the knobs are screw threaded into the side strips and are so located that when picked up by the knobs, the instrument is substantially balanced.

The top and bottom strips 112 and 112a are identical and may be machined in pairs or in a number of pairs. Likewise, the side strips 114 and 114a are identical and may be machined in pairs or in a number of pairs. As indicated on Fig. 1 of the drawings, the top and bottom strips are graduated for marking "buttock lines," and the side strips for "water lines." The "base line" is indicated on the inside edge 129 of the bottom strip and it continues at each end across the side strips. The base line must be parallel with the lower drawing edge, 124, of the lower strip 112a. The tolerance for parallelism from the marking edge of the base line to the instrument's lower drawing edge is ±.0015". The dimension of the strip from the base line to the bottom drawing edge is not critical; parallelism is critical. The bottom and top strips have the centerline, ₡ Ship, engraved thereon. The centerline must be perpendicular to the baseline and parallel with the outer or drawing edges 126 and 128 of the vertical strips 114 and 114a.

The marking dimension shown on the instrument are for drawings made to a ⅛"=1'0" scale, which is typical for plans for large naval ships. With reference to the top and bottom strips 112 and 112a, there are a series of very accurately spaced dual vertical or buttock marking surfaces, 130, to the left and right of the centerline. For the ⅛" scale, the vertical marking surfaces or graduations 130 are at four foot intervals for the first sixteen feet, marked ₡ 4', 8', 12', 16', and at eight foot intervals from sixteen to eighty feet, marked 16', 24', etc. to 80'. The vertical buttock marking surface distances have a tolerance of ±.002", and for laying out and machining the instrument it is necessary for accuracy to measure the distance from the vertical centerline for each buttock dimension to prevent accumulation of tolerances.

With reference to the vertical or side strips 114 and 114a, there is shown a series of very accurately spaced dual waterline marking surfaces 132 in slots which are horizontally parallel to the baseline and perpendicular to the centerline. The waterline distances also have a tolerance of ±.002", are at intervals of two, four, eight and ten feet, and are marked 2', 4', 6', 8', 12', 16', etc. to 40', and 48', 56', etc. to 80', and 90', 100', from the baseline. In laying out the instrument, the horizontal waterline marking edges are each measured from the baseline to prevent accumulation of tolerances. The slant edges 134 and 136 opposite the marking edges 130 and 132, respectively, act as mental guides for the designer so that he uses only as marking edges the edges that are perpendicular to the respective sides of the instrument.

As pointed out hereinbefore, for ultra-precise work, such as the design of hull forms for naval ships, the instrument is made of stainless steel of a grade equivalent to that used for the blade of a good steel T-square, or for a good steel straight edge. However, for less exacting work, the instrument may be made of a less expensive material and a material that is more easily machined, such as, for example, a good grade of plastic such as used for triangles, protractors and other drafting instruments. Also this latter type of material lends flexibility to the instrument and adapts it for use in marking graduated spaces on curved surfaces.

In using the instrument to make a set of grid lines for a body plan (Fig. 4), for example, select a sheet of drawing paper of the desired size, place a straight edge close to the lower edge of the drawing paper and weight it down at the ends to prevent movement. If desired, clamps may be provided to secure the straight edge to the drawing table. Place the instrument on the drawing paper where the body plan is to be located, and with its lower edge against the straight edge. In this position the designer is able to mark off the locations for all the grid lines for the body plan (Fig. 4). Do not move the instrument before all lines are marked off. First mark off the baseline on the inside of the lower strip on the marking surface adjacent to the left and the right side "base line" markings 129, Fig. 1. Then mark off the desired waterlines on the right and on the left vertical strips. Next mark the markings for the ship's centerline at the marking spaces in the middle of the top and bottom strips. Continue by marking off at the top and bottom strips the desired spacings for buttock lines, to the right and to the left of the markings for the ship's centerline. It is best to indicate in pencil alongside the marked off lines what water and buttock lines they are. Mark them as 2 ft.—4 ft.—6 ft.—8 ft. etc. at the inside edge of the marking spaces. Mark in pencil also a notation for the ₡ and baseline. This will eliminate identification later on when the lines are drawn in over the markings. With all lines marked off for the body plan (Fig. 4), proceed by moving the instrument to the right or left until the first markings show up on the instrument's vertical drawing edge for buttock lines. They will line up and the first buttock can be drawn in. Proceed to draw in all buttocks and the ship's centerline for the body plan. The waterlines for the body plan can be drawn in at the same time with those for the profile view (Fig. 5).

Next draw a fine line along the straight edge in the direction of the space intended for the profile view and mark off thereon locations for the forward and aft perpendiculars and the station lines therebetween. Use the top edge of the instrument to draw in these vertical lines. As is conventional in naval architecture, the profile and half breadth views are divided into twenty stations, ten on each side of midship, ⊗, between the forward and aft perpendiculars, and as shown in Fig. 5, are marked 0, 1, 2, etc. to 20; the 0-line being the forward perpendicular, the 20-line the aft perpendicular and the 1–19 lines the station lines. Next use the instrument to make the markings for the waterlines and baseline in the profile view, Fig. 4. If the station lines are far apart it appears best to lift the instrument and place it where the perpendiculars are going to be drawn. Make the drawn in vertical lines long enough to suit also the half breadth view. It appears best at this time to use the straight edge to draw in the waterlines and the baseline for body plan and profile views.

For the half breadth view (Fig. 6), place the straight edge on one of the drawn in waterlines of the profile view. The buttock lines and the ship's centerline can now be marked off by turning the instrument 90°. Put the right shorter side now on the straight edge. After being marked off, the lines are drawn in, again by means of the straight edge. Check the station spacing at the upper end of the perpendiculars, they should be accurately spaced. Check, before drawing, that the drawing edges of the instrument and the straight edge are clean to assure accuracy.

As stated hereinbefore, the illustrated instrument is designed to a ⅛"=1 ft. scale. For 1/16" scale drawings multiply the engraved waterline and buttock dimensions by 2. For ¼" scale divide by 2; for ½" scale divide by 4, etc. When extra lines are necessary between the shown buttock or waterlines markings they can always easily be added with an architect scale and drawn in by means of the instrument or straight edge. A hard, sharp V-shaped flat edge pencil, a 9H, is recommended for marking, and a fine-pointed 5H pencil for drawing in the lines over the markings.

Thus, by the use of the precision instrument of the instant invention, there may be produced, as shown in Figs. 4, 5 and 6, a grid work of horizontal and vertical lines representing baselines, centerlines, waterlines, buttock lines, fore and aft perpendiculars and station lines for body plan, profile and half breadth views. The grid lines are used, of course, for plotting the various curves and contours that are necessary for ship designing, calculating and building; only the bare outlines of a ship's hull being shown in Figs. 4–6 of the drawings.

It should be understood, of course, that the foregoing disclosure relates to only a preferred embodiment of the invention and that numerous modifications or alterations may be made therein without departing from the spirit and the scope of the invention as set forth in the appended claims.

What is claimed is:

1. An instrument for laying out basic grid lines, comprising top, bottom and side strips joined at their ends into a rectangular frame, each of said strips having flat upper and lower surfaces and straight outer edges with the outer edges of the top and bottom strips in parallel relation with each other and with the outer edges of the side strips in parallel relation with each other and in perpendicular relation with the outer edges of the top and bottom strips, each of the top and bottom strips being provided with a plurality of spaced slots formed in the inner edge thereof and each of said slots having straight sides thereof perpendicular to the straight outer edge of the strip, with the straight sides of the slots being in parallel relation with each other, and each of the straight sides of the slots of one of the top and bottom members being in direct alignment with a companion straight side in the other of the top and bottom strips, each of the side strips being provided with a plurality of spaced slots formed in the inner edge thereof and each of said slots having a straight side thereof perpendicular to the straight outer edge of the strip, with such straight sides of the slots being in parallel relation with each other and each of the straight sides of the slots of one of the side strips being in direct alignment with a companion straight side in the other of the side strips, and the straight sides of each of the slots of the top and bottom strips being perpendicular to the straight sides in each of the slots of each of the side strips.

2. An instrument as set forth in claim 1 wherein the frame includes a baseline parallel with the outer edge of the bottom strip, wherein the straight sides of the slots in the bottom and top strips are perpendicular to such baseline and wherein the straight sides of the slots in the side strips are parallel with such baseline.

3. An instrument as set forth in claim 2 wherein the baseline is formed at least in part by the inner edge of the bottom strip.

4. An instrument as set forth in claim 2 wherein the straight sides of the slots in the side strips are arranged in groups of equal spacing within a group, with the spacing of the straight sides of one group differing from those of another group, with the spacing of the straight sides being measured from the baseline and with the spacing within the groups being greater as the group is further removed from the baseline.

5. An instrument as set forth in claim 2 wherein the frame includes a centerline that is perpendicular to the outer edge of the bottom strip, to the baseline and to the straight sides of the slots in the side strips.

6. An instrument as set forth in claim 5 wherein the straight sides of the slots in the top and bottom strips are arranged in pairs of groups of equal spacing within a pair of groups, with the spacing of the straight sides of one pair of groups differing from those of another pair of groups, with the spacing of the straight sides being measured in opposite directions from the centerline, and with the spacing within the pairs of groups being greater as a pair of groups is further removed from the centerline.

No references cited.